D. SAGER.
Manger.
No. 45,081. Patented Nov. 15, 1864.
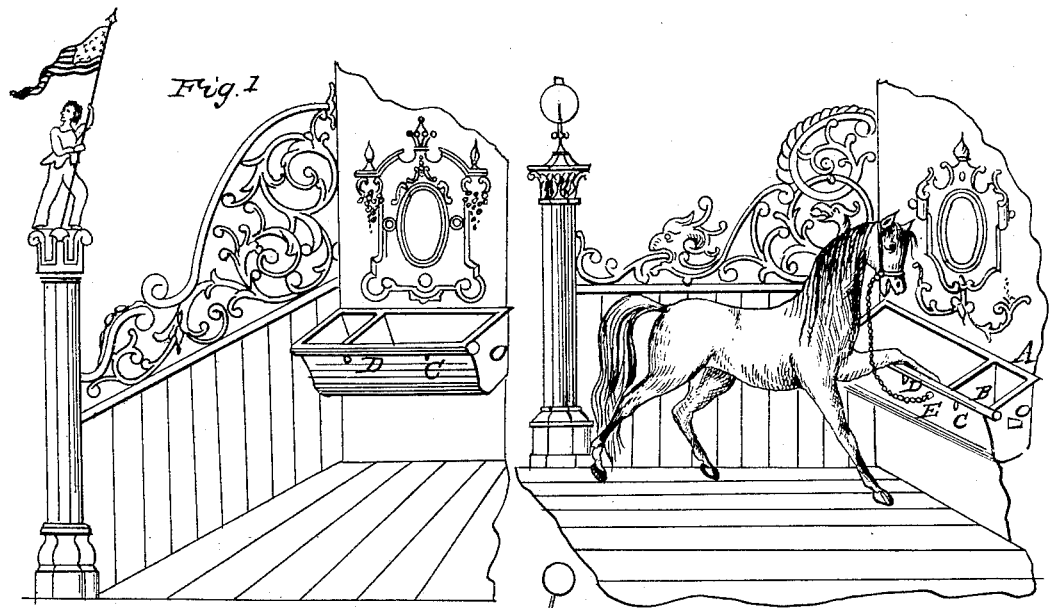
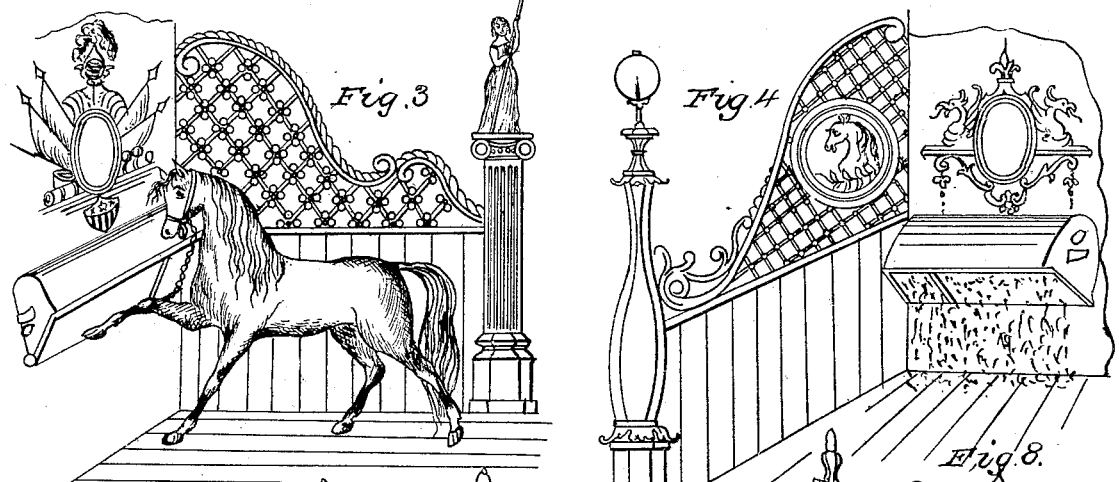
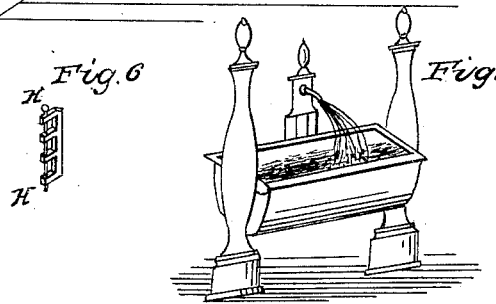
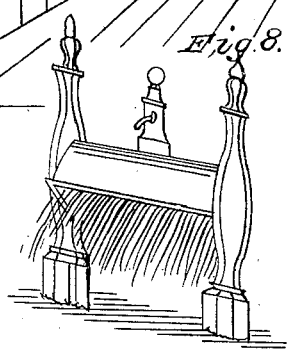
WITNESSES
INVENTOR
Daniel Sager

UNITED STATES PATENT OFFICE.

DANIEL SAGER, OF ALBANY, NEW YORK.

IMPROVED MANGER.

Specification forming part of Letters Patent No. 45,081, dated November 15, 1864.

*To all whom it may concern:*

Be it known that I, DANIEL SAGER, of Albany, in the county of Albany and State of New York, have invented certain new and useful Improvements in Mangers or Troughs for Feeding or Watering Horses, and other Animals; and I do hereby declare that the following is a full and exact description thereof, reference being had to the accompanying drawings, and to the letters of reference marked thereon.

The nature of my invention consists in mounting the manger on journals or pivots in such a way that it can be readily tilted or rotated, and at the same time adjusted in height to suit the animal, and also in a novel arrangement or device, to be used in connection therewith, for fastening the animal.

To enable others skilled in the art to construct and use my invention, I will proceed to describe its construction and operation.

Figure 1 is a perspective view of a manger made with my improvements.

The body of the manger may be made of any desirable form and material, though I prefer constructing it of cast-iron and casting it in one piece. It may also be constructed with one or more divisions, as shown in the various figures, for the purpose of forming apartments for receiving the different kinds of food.

This manger is provided at each end with a projecting stud or journal, o, which may be cast with the manger, and which should be so located thereon that when the manger hangs suspended on said journals it will remain with the open side uppermost. I then construct a bracket, as shown at 6 of same figure. This bracket has a series of projecting arms, 5, having spaces between them sufficently large to receive the journals o on the ends of the manger. Through the ends of these arms is bored a hole vertically in line, through which a rod, H, is passed, and which serves to hold the journals in place when once inserted in their proper position.

By inserting the journals o of the mangers into one or the other of the spaces between the arms of the brackets, the height of the manger may be adjusted, as desired, to suit animals of different sizes.

To the front of the manger, and near each end thereof, is secured a small projection or lug, C, as shown in Figs. 1 and 3. Through these lugs is bored a hole, and in these holes is secured a rod, D, reaching from one to the other of the lugs. On this rod is placed loosely a ring, E, to which the animal's halter is secured. Other devices or arrangements may be substituted for fastening the animals; but I prefer this, as it gives to the animal greater freedom of movement within the stall, and is less liable to entangle his feet, or if entangled therewith they are more readily released.

The operation of my manger is so obvious as to require no further description.

Among the many advantages of my improved manger is the security that it affords against injury to the horse caused by getting hisfoot into the manger, as usually constructed. When such an accident occurs, and which is as likely to occur in the night, when there is no one present to afford relief, as at any other time, the horse is very apt to have his leg injured by straining, and by cutting or bruising it about the fetlock-joint, in case the old-fashioned, stationary manger is used; but by my improvement, all this is avoided, as when the horse puts his foot into the pivoted manger it readily yields to the force exerted thereon, and, turning on its journals, allows the foot to slip out and fall safely to the floor, when the manger automatically resumes its original and proper position.

Another advantage of my improvement is, that it prevents that most disagreeable of habits in horses known as "cribbing." In the case of a horse addicted to this habit seizing the front of my manger it yields readily to the force exerted, when the horse finding his efforts ineffectual, soon desists.

More important still is the fact that horses afflicted with numerous diseases—such as diphtheria, distemper, glanders, &c.—are fed in the ordinary mangers, which, having no convenient means of being thoroughly cleansed, convey the diseases to other horses which come after them and eat therefrom. My improved manger cannot only be entirely emptied of any tainted or affected food which may be left therein, but it can be readily and thoroughly cleansed of all impurities by washing or scalding, and all refuse or foul matter at once be removed by simply turning it on its journals. This, at public houses and in livery stables, and all other places where large numbers of horses or other animals are congregated, is a very important feature.

It is also obvious that my improved manger may be used with equal advantge, as a watering-trough, as shown in Fig. —. In this case it can be easily emptied of all impurities by simply tilting it, and any surplus water which would otherwise be likely to be left therein and freeze, thus injuring the trough, could be emptied out, even by a child.

Having thus described my invention, what I claim as new, and desire to secure by Letters Patent, is—

1. The rotating manger, provided with the journals $o$ and rod D, substantially as shown.

2. The bracket 6, or its equivalent, when used in combination with the manger, as and for the purpose set forth.

DANIEL SAGER.

Witnesses:
H. W. McCLELLAN,
E. NEWCOMB.